Patented Jan. 4, 1938

2,104,092

UNITED STATES PATENT OFFICE 2,104,092

QUATERNARY AMMONIUM COMPOUNDS

Ferdinand Münz, Frankfort-on-the-Main, and Karl Keller and Otto Trösken, Frankfort-on-the-Main-Fechenheim, Germany, assignors to General Aniline Works, Inc., New York, N. Y., a corporation of Delaware No Drawing. Application March 28, 1936, Serial No. 71,510. In Germany April 3, 1935

3 Claims. (Cl. 260—99.12)

Our present invention relates to quaternary ammonium compounds.

U. S. Patent No. 2,040,061 relates to quaternary ammonium compounds derived by far-reaching alkylation from mixtures of polymeric ethylenepolyamines, which compositions are characterized by the property, on after-treatment therewith of dyeings on cellulose material by means of substantive dyestuffs, of substantially improving the fastness of such dyeings to water, perspiration, boiling acids and washing.

Our present invention relates to certain embodiments of the above mentioned series of quaternary ammonium compounds of which the following are illustrative examples in which the parts are by weight and all temperatures are in centigrade degrees.

Example 1

54 parts of the formal of $\alpha$-dichlorohydrine (cf. Beilstein, "Handbuch der organischen Chemie", 4. edition, vol. 1, page 575) are mixed with 95 parts of tetramethyl-ethylenediamine and the mixture is heated for some hours at 140° to 150° C. The formed ammonium base is freed by extracting with benzene from the undecomposed starting material. It represents a water soluble brownish resin like product. When after-treating dyeings, which have been produced on cellulose material by means of substantive dyestuffs, with an aqueous solution of the said product the fastness of the dyeings is substantially improved.

Example 2

To 129 parts of $\alpha$-dichlorohydrine and 120 parts of water while stirring slowly at 60 to 70° C. ammonia is added, until all of the dichlorohydrine is dissolved. When cool, some small quantities of insoluble impurities are removed by filtration and the ammonia is removed by warming in vacuo at 40 to 45° C. with the addition of a caustic soda solution. When treating the aqueous solution of the formed mixture of bases thus obtained with dimethylsulfate in the presence of sodium carbonate a mixture of the corresponding quaternary ammonium compounds being a light colored resin is obtained.

The product thus obtained has a similar effect of improving the fastness of dyeings obtained by means of substantive dyestuffs on cellulosic materials as the product of Example 1.

A similar product is obtained by starting from epichlorohydrine.

We claim:

1. A quaternary ammonium compound obtained by acting with ammonia on $\alpha$-dichlorohydrine and treating the mixture thus obtained with dimethyl-sulfate in an aqueous solution of sodium carbonate, which product is a light colored resin like substance and is characterized by the property, on after-treatment therewith of dyeings on cellulose material by means of substantive dyestuffs, of substantially improving the fastness of such dyeings to water, perspiration, boiling acids and washing.

2. A quaternary ammonium compound obtained by acting with ammonia on a chlorhydrine and treating the mixture thus obtained with dimethyl-sulfate in an aqueous solution of sodium carbonate, said compound being a light-colored resin-like substance characterized by the property, on after-treatment therewith of dyeings on cellulose material by means of substantive dyestuffs, of substantially improving the fastness of such dyeings to water, perspiration, boiling acids and washing.

3. A compound as defined in claim 2 wherein the chlorhydrine is selected from the class consisting of epichlorohydrine and $\alpha$-dichlorohydrine.

FERDINAND MÜNZ.
KARL KELLER.
OTTO TRÖSKEN.